United States Patent [19]
Pan

[11] Patent Number: 5,246,294
[45] Date of Patent: Sep. 21, 1993

[54] FLOW-REGULATING HYDRODYNAMIC BEARING

[75] Inventor: Coda H. T. Pan, Millbury, Mass.

[73] Assignee: Digital Equipment Corporation, Maynard, Mass.

[21] Appl. No.: 990,820

[22] Filed: Dec. 14, 1992

Related U.S. Application Data

[63] Continuation of Ser. No. 707,703, May 30, 1991.

[51] Int. Cl.$^5$ ............................................. F16C 32/06
[52] U.S. Cl. ................................... 384/119; 384/110; 384/135
[58] Field of Search .............. 384/119, 124, 135, 130, 384/465, 488, 110

[56] References Cited

U.S. PATENT DOCUMENTS

| | | | |
|---|---|---|---|
| 3,123,730 | 3/1964 | Fagel | 310/54 |
| 3,195,466 | 7/1965 | Young | 103/87 |
| 4,427,308 | 1/1984 | Sandberg | 384/115 |
| 4,629,919 | 12/1986 | Merkle | 310/90 |
| 4,712,031 | 12/1987 | Anderson | 310/90 |
| 4,795,275 | 1/1989 | Titcomb et al. | 384/107 |

*Primary Examiner*—Lenard A. Footland
*Attorney, Agent, or Firm*—Barry N. Young; Ronald C. Hudgens

[57] ABSTRACT

A self-lubricating hydrodynamic spindle bearing for support of a spindle of a magnetic disk drive assembly includes a crankcase design which provides large reservoirs for oil storage with an air cover in communication with the ambient environment through an air vents provided by clearance seals formed between respective central passages of housing-sealing endcaps and the shaft. The crankcase reservoir volume is defined within the bearing so that natural body force effects cause the lubricant to be fed into the hydrodynamic bearing. A leak-preventing capillary trap of minimal continuous axial length may be provided at the clearance seal for passive capture of wandering lubricant when the bearing is at rest. Full evacuation of lubricant trapped at the clearance seal is achieved toward the interior of the housing by centrifugal pumping, e.g., the inboard side of the rotating part of the seal is coned and fluted such that the rotating centrifugal field will throw all statically trapped oil into the lubricant reservoir. A three way restrictive valve is provided to assure balanced feeding of lubricant to both ends of the spindle for either vertical or horizontal spindle orientation. A pressure-actuated bladder may be attached to the bearing to deliver a volume of lubricant to the bearing on demand.

20 Claims, 3 Drawing Sheets

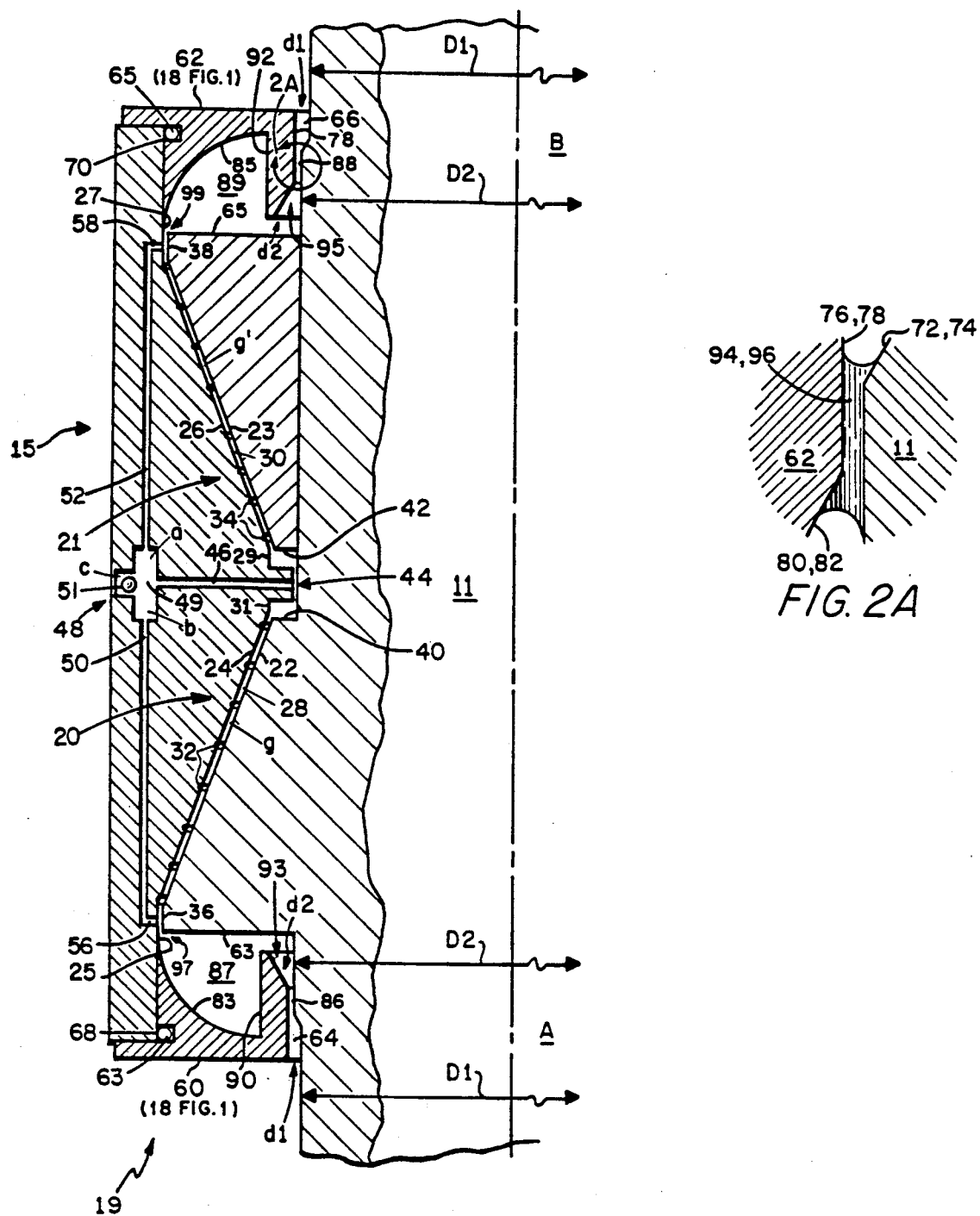
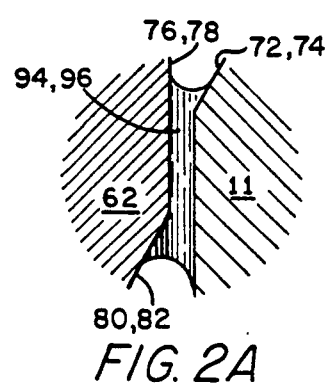
FIG. 2
FIG. 2A

FLOW-REGULATING HYDRODYNAMIC BEARING

This application is a continuation of application Ser. No. 07/707,703, filed May 30, 1991.

BACKGROUND OF THE INVENTION

This invention relates to precision hydrodynamic bearings.

As part of the continuing advances in computer technology, greater and greater amounts of data are sought to be stored in smaller and smaller areal densities on magnetic disks. Magnetic disk drives typically include both a plurality of spinning magnetic disks suspended on a common precision spindle bearing assembly and also at least one magnetic read/write head which "flies" in close proximity to and at selected locations over an assigned one of the plurality of disks. The head reads or writes streams of data from or to "tracks" of magnetic interactions in the magnetic layer of a selected disk. The width of the tracks determines the number of tracks which can be defined on a given disk. The greater the number of tracks the greater the storage density. A magnetic disk drive assembly whose spindle bearing has low runout can accommodate higher track densities, and this results in increased storage density per disk.

Hydrodynamic spindle bearings are known in which the shaft part and the housing part have respective bearing surfaces which support relative rotary motion therebetween. By means of the bearing surfaces, one part rides on a film of liquid lubricant, e.g., oil, against the other part. These bearings generally have low runout, but require a continuously circulating lubrication supply. These bearings can be characterized by their means of lubrication, i.e., a lubrication system which is self-contained or which relies on an external supply.

Within the development of the self-contained lubrication type hydrodynamic spindle bearings comes the nettlesome problem of preventing lubricant leakage out of the bearing. In a magnetic disk drive, these losses can degrade bearing performance and thus cause read/write errors. As well, leakage of lubricant can lead to contamination of the magnetic disk surface, which can cause malfunction of the read/write process or even catastrophic failure of the flying head assembly.

In one known commercially successful product, the Phillips Video 2000 videocassette recorder, lubrication losses are minimized by using grease lubrication. The useful life of such bearings, of course, is limited by the stability of the grease. As well, rotational velocity is effected by the grease viscosity. No known disk drive spindle bearings utilize this technology.

Clearance type lubricant seals are required in disk drive applications to satisfy desired longevity. Clearance seal hydrodynamic spindle bearings, e.g., the ferromagnetic fluid type and the capillary seal type, are well known. However, they are strained by the centrifugal effects of the rotating part (especially a rotating housing), and are vulnerable to leakage of lubricant as may be initiated by trapped bubbles. Associated with the concern about trapped bubbles and lubricant blowout, use of o-ring static seals for assembly is often avoided, and then the lubricant filling requires a relatively elaborate vacuum impregnation procedure. Nevertheless, oil-lubricated bearings with clearance seals are of interest.

It is therefore an object of the present invention to provide a hydrodynamic spindle bearing of the clearance seal type which is self-lubricating and essentially leak-free by utilizing the centrifugal acceleration of rotation to keep the lubricant inside the housing. Risk of leakage through the clearance seals is minimal when the spindle is running due to the tendency of the centrifugal acceleration of rotation to keep the lubricant inside the housing.

It is another object of the present invention to provide a hydrodynamic spindle bearing of the clearance seal type which is not likely to suffer from seal blowout.

SUMMARY OF THE INVENTION

The present invention provides a self-lubricating hydrodynamic spindle bearing for support of a spindle of a disk drive assembly in a high track density magnetic recording system. In one aspect of the invention, the lubricant retention function associated with the crankcase of an automotive engine is utilized to avoid seal blowout due to gaseous ingestion. Risk of lubricant leakage thus is practically nil when the spindle is running. In particular, the crankcase design provides large reservoirs for oil storage with an air cover in communication with the ambient environment through an air vent provided by a clearance seal.

In one embodiment of the invention, removable endcaps are mated with the bearing housing over the bearing shaft, creating a crankcase therein. This design defines a copious reservoir volume for holding the lubricant when the spindle is not operating, such that the lubricant level is unlikely to reach the clearance seal for various orientations of the spindle axis. The unfilled space of the reservoir is vented to the external atmosphere during operation. Because the atmosphere of the interior communicates freely with the outside, use of o-ring type static seals to seal the endcaps to the housing is without the risk of "blow-out" caused by expansion of trapped bubbles. Use of removable endcaps also facilitates loading of the lubricant into the bearing.

The crankcase reservoir volume is defined within the bearing so that natural body force effects cause the lubricant to be fed into the hydrodynamic bearing, i.e., the endcap cross-section is such that the centrifugal field effectively feeds the entrance edge of the hydrodynamic bearing lubrication circuit when the housing is rotating about the fixed shaft.

In another aspect of the invention, a leak-preventing capillary trap of minimal continuous axial length is provided at the clearance seal for passive capture of wandering lubricant when the bearing is at rest. The capillary trap, if employed, prevents leakage of the lubricating oil when the system is at rest. This trap has a central minimum gap such that the oil meniscus is stabilized statically. Full evacuation of lubricant trapped at the clearance seal is achieved toward the interior of the housing by centrifugal pumping, i.e., the inboard side of the rotating part of the seal is coned and fluted such that the rotating centrifugal field will throw all statically trapped oil into the lubricant reservoir.

In yet another aspect of the invention, a three way restrictive valve is provided to assure balanced feeding of lubricant to both ends of the spindle for either vertical or horizontal spindle orientation.

In a preferred embodiment of the invention, a disk drive spindle bearing assembly includes a housing and a shaft having cooperating bearing surfaces which define at least one transverse bearing gap therebetween. The bearing surfaces further define a lubricant entrance end and a lubricant exit end of the gap. The bearing housing includes a flow control valve and at least one axial passage coupling the valve to the lubricant entrance end of the gap. The housing has at least one radial passage for delivery of lubricant from the lubricant exit end of the gap to the lubricant valve, and the lubricant valve delivers lubricant to the lubricant entrance end of the gap via the axial passage. The housing and shaft, along with housing endcaps mated over the shaft, form a lubricant storage reservoir therebetween, and further form a feed means for centrifugally feeding of stored lubricant from the reservoir into the entrance end of the gap. The cooperating bearing surfaces further define an inwardly directed viscous pumping means (which may include helically scored surfaces of the housing bearing surfaces) for pumping of lubricant from the entrance end to the exit end of the gaps, and which may further include the housing radial passage, for pressurizing and circulating the lubricant therein.

The bearing assembly also has a crankcase means for venting the bearing interior to the ambient environment. The crankcase means includes at least one of the housing endcaps having a central bore and being concentrically mated over the shaft for defining a clearance seal thereat. The clearance seal includes a capillary trap for defining the air/lubricant interface within the clearance seal. This assembly includes crankcase vent clearing means for drawing lubricant from the clearance seal into the bearing by centrifugal action, clearing open the clearance seal so as to be able to act as a crankcase vent thereby.

In still another aspect of the invention, a bladder may be attached to the bearing to supply a volume of lubricant to the bearing on demand. The bladder responds to a rotation-actuated differential pressure to cause the lubricant to flow out of the bladder into the lubrication circuit when the spindle speed exceeds a predetermined value. The lubricant returns to the bladder when the spindle speed falls below this value. The lubricant thus is entrained within the bearing when operating at speed or within the bladder when not up to speed, thus virtually eliminating the possibility of lubricant leakage out of the bearing.

A particularly preferred embodiment of the invention includes a compliant bladder means for delivery of lubricant to the bearing from a bladder reservoir. The shaft is provided with a central axial passage which delivers lubricant from the bladder reservoir through a central radial passage of the shaft to the housing flow control valve via a housing central radial passage, when the housing is in rotation.

The shaft central radial passage communicates with the housing central radial passage at a connection zone within the bearing, defining a radial lubricant flow path to the valve. Conical bearing surfaces at each end of the device form a tightly toleranced gap therebetween distal to the connection zone, wherein each such gap communicates with the connection zone via a relatively loosely toleranced axial passage between the shaft and housing. Each such passage terminates at the connection zone via a tightly toleranced axial capillary seal. The central radial passage of the housing is also tightly toleranced, forming a shaft capillary seal adjacent to the connection zone. The capillary seals seal the bearing at rest, and enable lubricant feed to the bearing as the housing rotates about the fixed shaft. However, other bearing configurations, such as plate and journal, are also within the scope of the present invention.

In this rotating housing design, an important physical parameter to be considered is the centrifugal force which is imparted to the liquid lubricant if it adheres to the bearing surface of the rotating housing and assumes its angular speed. This can be expressed in terms of the centrifugal head which is more than five times the overall length of the bearing of typical dimensions. In other words, if the spindle is vertical, the bearing can be more than five times the typical height of the bearing and the lubricant would not be driven out of the bearing cavity through the shaft clearance at the lower end by gravity.

It is further noted that while the centrifugal head might be a potential burden for clearance-type seals, it is a salient feature of the present invention in that the centrifugal head is utilized to retain the lubricant. As well, the general centrifugal effect is to drive the lubricant to the largest diameter of the bearing cavity away from the clearance seals on the rotating axis. Hence, as seen in the illustrated configurations, the lubricant is always driven toward the outer peripheries of the conical bearings. This condition particularly favors an inward-pumping grooved bearing arrangement for which the outer periphery is the feeding edge of the lubricating film. It will thus be appreciated that a special feature of the invention is the utilization of the natural centrifugal acceleration field for fluid retention and flow regulation. Since the level of centrifugal field in a typical disk drive spindle (based on 3,600 rpm and 5 mm radius) is over 70 g's, this provides a very powerful control mechanism.

The details of the crankcase configuration may depend on whether the housing or the shaft rotates during operation but the basic concept as explained above is applicable in either case. The present crankcase design thus will be understood to maintain and contain the lubricant supply for the dormant device, employing a clearance seal with an optional capillary trap, and to centrifugally clear the seal and feed lubricant into the bearing as the bearing goes into operation. With the seal cleared, now the crankcase can vent entrained gases without loss of lubricant. The optional bladder provides further security against lubricant leakage.

As a result of the foregoing, the lubricating oil is fully contained within the bearing housing in spite of a variety of field environments which would otherwise induce leakage of the lubricant. A typical bearing according to the invention can range in diameter from about 5 mm to about 2 cm, operating at a speed ranging from about 1800 to about 10,000 rpm. Nevertheless, other sizes and speeds are also within the scope and teaching of the present invention.

The lubricant type and volume must be selected such that adequate lubrication is achieved during operation, and the lubricant reservoirs must be sized accordingly. The lubricant is preferably a viscous oil, such as a vacuum oil which is chemically compatible with head/disk interface requirements.

BRIEF DESCRIPTION OF THE DRAWINGS

These and other features and advantages of the present invention will be more fully understood by reference to the following detailed description in conjunction with the attached drawing in which like reference numerals refer to like elements and in which:

FIG. 2 is a partial side cross-section of an embodiment of the invention, and FIG. 2A is an inset showing a capillary trap seal of the invention.

DETAILED DESCRIPTION OF PREFERRED EMBODIMENTS

Figure 1:
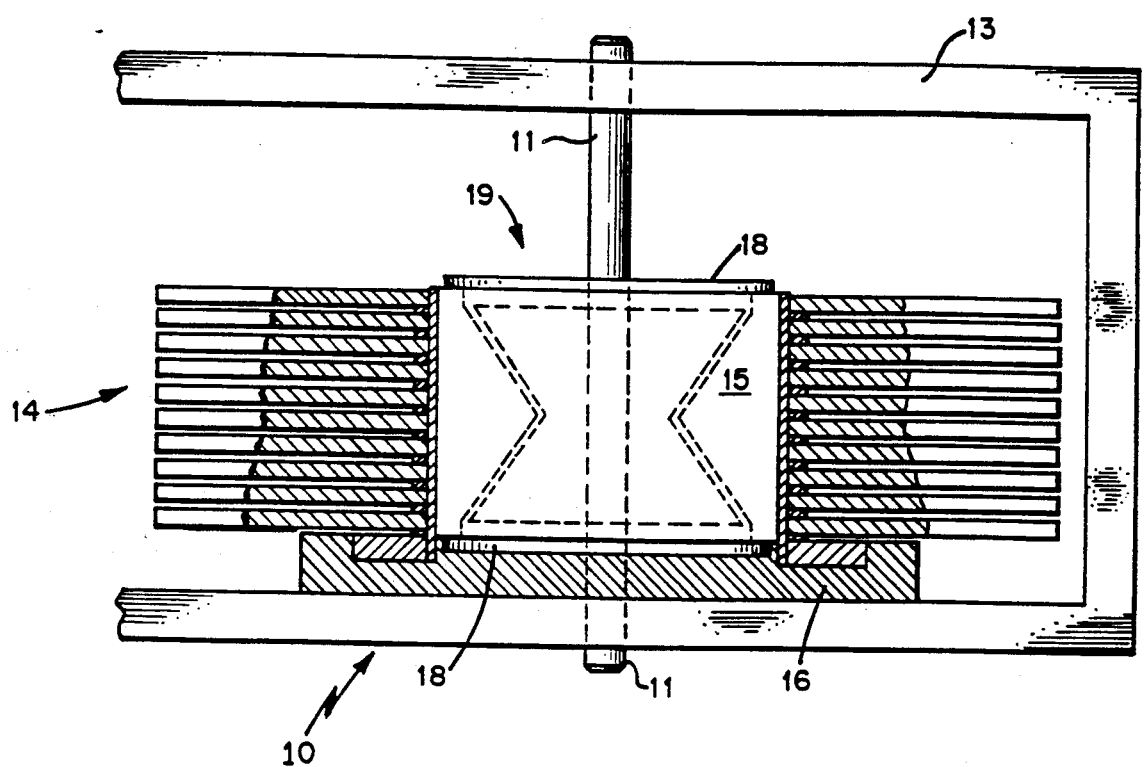
FIG. 1 is a cut-away side view of a magnetic disk drive assembly incorporating the present invention.

An illustrative disk drive assembly 10 is shown in FIG. 1 where shaft 11 is fixedly mounted in drive assembly frame 13. At least one and normally a plurality of magnetic disks 14 are mounted concentrically to the spindle shaft 11 over and supported by a rotating spindle housing 15. A motor 16 also mounted to frame 13 drives the rotating housing 15 and causes the disks 14 to rotate. Typically the exterior of the spindle housing 15 receives a hub with spacers for receipt of disks 14. The housing ends are capped by endcaps 18. Access to the data stored on a given spinning disk is obtained by servoed placement of a magnetic head (not shown) adjacent to the data track to be read. A self-pumping hydrodynamic spindle bearing assembly 19 according to the present invention is formed by internal cooperation of endcaps 18, housing 15 and shaft 11, as more fully set forth below.

One embodiment of bearing assembly 19 is shown in FIG. 2, where housing 15 mounted on shaft 11 forms a pair of conical bearings 20, 21 with their apexes directed toward each other. Specifically, shaft 11 includes conical portions 22, 23 which mate with inclined wall portions 24, 26 of housing 15, separated by bearing gaps, g,g', respectively. The housing wall portions 24, 26 are internally grooved, such as with inward-pumping spiral grooves 32, 34, substantially over their bearing surfaces. Wall portions 24, 26 flare radially inwardly from cylindrical surfaces 25, 27 to cylindrical surfaces 31, 29, respectively.

The shaft conical portions 22, 23 taper radially inwardly from cylindrical surfaces 36, 38 to truncated ends 40, 42. These ends 40, 42 define a connection zone 44 therebetween. At least one of the conical portions 22, 23 is an insert which is mated over and affixed to shaft 11 so as to become a part thereof, thus to facilitate assembly of bearing assembly 19. In FIG. 2, conical portion 23 is formed by such an added insert, with portion 22 being an integral part of shaft 11.

Housing 15 includes at least one radial passage 46 which extends from connection zone 44 to a three-way valve assembly 48. T-shaped valve assembly 48 includes passages 50, 52 which extend axially from valve control center 49 out to radially inwardly directed discharge ports 56, 58, adjacent to cylindrical surfaces 36, 38, respectively, and also includes a float 51. Float 51 assumes a position within valve control center 49 depending upon the orientation of the bearing at rest, with float 51 reacting to gravity accordingly. With the valve vertical, end A up, float 51 falls toward end B and nestles in seat "a" of valve 48; in the reversed vertical orientation, float 51 falls toward end a and nestles into seat "b" of valve 48. In either case, with the bearing spinning, float 51 only partially obstructs fluid flow where it lies such that the lower passage 50 or 52 has a higher flow resistance than the upper passage 52 or 50, so as to balance the effect of gravity draining lubricant away from the upper passage toward the lower passage. With the spinning bearing horizontally oriented, float 51 is thrown into seat "c", such that fluid flow is balanced between passages 50, 52.

The endcaps 18 of FIG. 1 are shown in FIG. 2 in greater detail as endcaps 60, 62. These endcaps are concentrically engaged over shaft 11 at their respective passages 64, 66, forming clearance seals thereat. Preferably each of the passages 64, 66 flares open into bearing assembly 19. As shown in FIG. 2, passages 64, 66 are defined by cylindrical walls 76, 78 nominally at a first diameter D1 and opening out along cylindrical walls 80, 82 to a larger second diameter D2, which assists in clearing the seals inwardly into the bearing as the housing begins rotation.

The endcaps also define lubricant reservoirs 87, 89 between axially extending walls 90, 92, transverse walls 83, 85, and cone end walls 63, 65, respectively. As seen in cross-section, these transverse walls are preferably arcuate, providing an autofeed feature by centrifugally directing the lubricant from the reservoirs into the bearing infeeds 97, 99 during spindle rotation. The endcaps are sealingly mated against static o-rings 63, 65 at housing annular ends 68, 70.

Shaft 11 is graduated at its ends from a smaller first outer diameter D1, D1 to a larger second outer diameter D2, D2 by means of tapered shaft portions 72, 74, respectively. A narrowed throat 86, 88 is formed by the endcap cylindrical wall 76, 78 and the adjacent shaft, and enables formation of a respective capillary trap seal 94, 96 thereat. The menisci formed by lubricant trapped in capillary trap seal 96 are shown in the inset of FIG. 2A. Generally, the trap seal and the menisci are formed as taught in U.S. Pat. No. 4,795,275, which is incorporated herein by reference.

The crankcase function of the invention is significant during operation of the bearing, when the centrifugal field clears the capillary seals 94, 96, opening throats 86, 88, such that these throats can then act as crankcase breather vents. This venting prevents pressure-induced seal, i.e., lubricant, blowouts. In particular, the crankcase fluid reservoirs 87, 89 are provided an air cover in communication with the ambient environment via the thus opened throats 86, 88, thus automatically equalizing pressure gradients which may develop within the bearing.

In operation, the lubricant flow begins with radially outwardly driving of the lubricant in reservoir 87 and/or 89, depending upon orientation of the bearing, up to and into the bearing entrance edges, i.e., infeeds 97, 99, adjacent the cone flat surfaces 36, 38, as the spindle housing rotates up to speed, and then along inward-pumping spiral grooves 32, 34 to connection zone 44. The lubricant then is thrown outward along radial passage 46 into valve assembly 48, which builds a head in valve 48 and which in turn drives the lubricant along passages 50, 52 axially from valve control center 49 out to the radially inwardly directed discharge ports 56, 58, adjacent to flat surfaces 36, 38, respectively, where the flow circuit begins again. The lubricant falls back according to gravity into one or both of the reservoirs when the bearing is at rest.

The capillary type clearance seal functions as a fluid trap when the spindle is not operating. In various embodiments, the fluid trapping function is enhanced by: providing a nonwetting treatment on the reservoir faces; providing tapered shaft clearance to stabilize trapped fluid at the minimum clearance location of the capillary seal; and/or providing tapered radial slots inboard of this minimum clearance location to function as centrifugal pump impellers to draw trapped fluid into the bearing interior as soon as the spindle rotates. While use of ferromagnetic sealing is also possible within the invention, the effective sealing of the present invention essentially obviates the need for use of ferromagnetic lubricant.

The installation orientation of the spindle affects details of various features cited in this application. Generally speaking, the principles for fluid retention as described for either fully vertical or fully horizontal orientation remain valid for an inclined orientation.

While either or both of the reservoirs themselves can be factory-loaded with lubricant, as in the embodiment of FIG. 2, a bladder may be provided to carry a factory-loaded supply of lubricant during product shipment, reducing the risk of leakage, but where the lubricant is delivered to the bearing as the housing rotates up to speed. Return of the lubricant to the bladder as the bearing comes to rest provides further secure storage of the lubricant, but is not essential unless further transport of the product is expected. The bladder may also be used to provide an additional supply of lubricant as the system demands.

Figure 3:
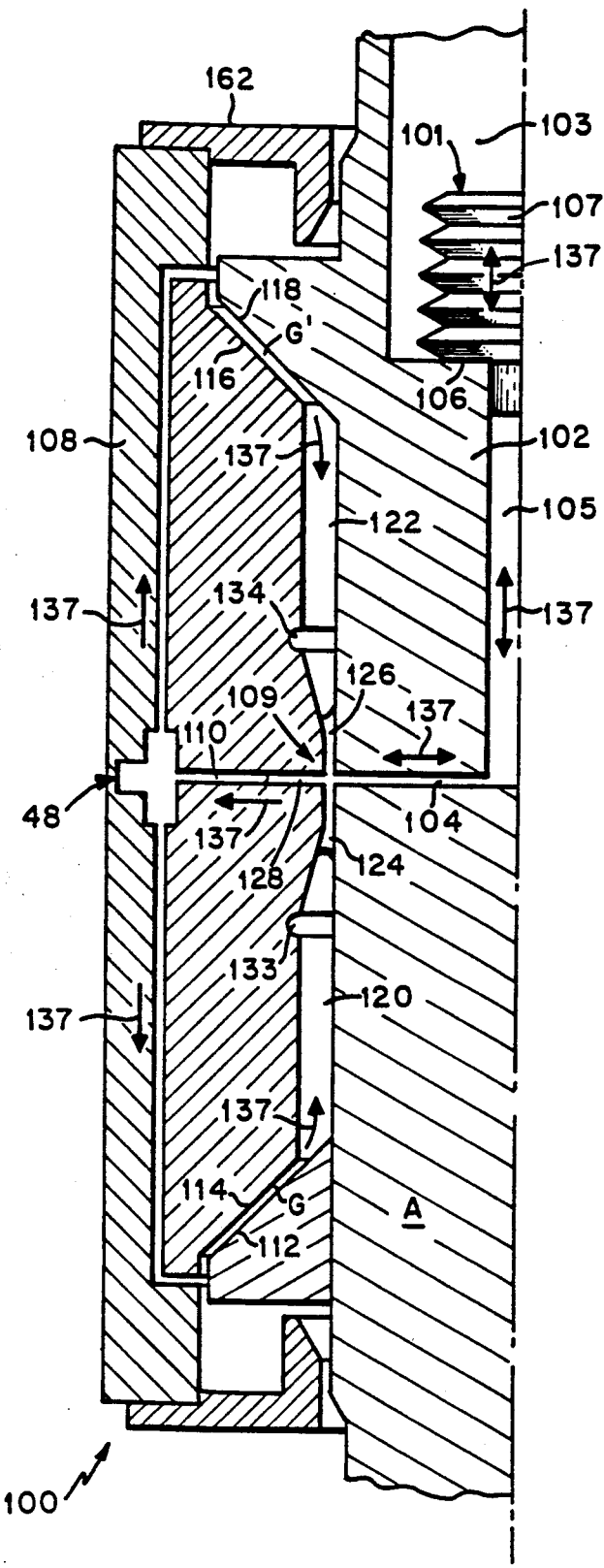
FIG. 3 is a partial side cross-section of an alternative embodiment of the invention.

As shown in FIG. 3, in an alternative embodiment of the invention, bearing assembly 100 is provided with a compliant bladder 101, such as a bag, bellows or diaphragm, for example, for automatic lubricant storage and delivery. Shaft 102 defines an annular chamber 103 and at least one radial passage 104 which couples chamber 103 via a central axial passage 105 to connection zone 109. Bladder 101 is sealingly engaged at shaft shoulder 106 in chamber 103 such that a lubricant flow path is defined between the interior 107 of bladder 101 through passage 105 and passage 104 to connection zone 109 for feeding of fluid into valve 48 via housing central radial passage 110. (Fluid flow is indicated by arrows 137.)

Cooperating conical bearing surfaces 112, 114 and 116, 118 at respective ends of device 100 form a respective tightly toleranced gap G,G' therebetween distal to connection zone 109. Each such gap forms a relatively high pressure capillary seal, and communicates with the connection zone via a relatively loosely toleranced and lower pressure axial passage 120, 122 defined between the shaft and housing. Each such passage 120, 122 terminates at the connection zone via a tightly toleranced axial capillary seal 124, 126. Preferably capillary seals 124, 126 are formed by a relatively long tapered surface of the housing or the shaft cooperating with an adjacent surface of the shaft or housing. The central radial passage 110 of the housing is also tightly toleranced, and also forms a capillary seal 128 similarly adjacent to the connection zone.

The bladder seals chamber 103 from the ambient environment, such that fluid flow is induced from the bladder to the connection zone when the pressure at connection zone 109 falls below the ambient, as centrifugally induced by rotation of the housing. Alternatively, chamber 103 is closed to the ambient environment and the bladder is exposed to a high pressure source as may be actuated by the spindle rotation. As well, the bearing is dimensional such that a liquid environment is maintained at least in capillary seals 124, 126, 128 and in passage 104, at rest.

Generally speaking, when the shaft rotates, the centrifugal force imposed upon the lubricant in housing radial passage 110 draws lubricant from connection zone 109 into valve 48, lowering the pressure at the connection zone. Therefore with the pressure behind the bladder being relatively high, lubricant in the bladder interior 107 is drawn via shaft central axial passage 105 through shaft central radial passage 104 to valve 48 via housing central radial passage 110 in response to the gradient.

More specifically, maintenance of the proper relationship of the capillary seals, in dimension and the pressure established thereat, relative to the ambient environment, is essential to operation of this embodiment. At rest, the pressure in passages 120, 122 is nearly ambient Pa, and the pressures P124, P126 and P128 at capillary seals 124, 126, 128, respectively, are essentially related as: $Pa > P126 = P128 = P124$. Also, the pressure P104 in shaft radial passage 104 is nearly equal to P128.

In operation, as the housing rotates, the centrifugal force applied to the lubricant at seal 128 causes P124, P126 and P104 to fall below Pa, and lubricant is thus drawn into the bearing from bladder 101 as it adjusts to the pressure change, as well as being drawn from passages 120, 122.

Thus it will be appreciated that the capillary seals 124, 126, 128 seal the bearing at rest, enable lubricant to be drawn out of the bladder to feed the bearing in use, and then are reestablished as the housing slows to a halt while the bladder expands and withdraws the lubricant supply.

Passages 120, 122 are provided with a circumferential groove 133, 134 defined in the shaft or housing. The function of these grooves depends upon orientation of the bearing. For example, if the bearing is operating vertically with end a up, the lower capillary seal 126 terminates at or above groove 134. The lower groove thus acts as a stabilizer for the meniscus of the lower seal, while the meniscus of the upper seal will be located below groove 133 and above the central connection zone 109.

As will now be appreciated, the invention provides a bearing which may be operated either vertically or horizontally. However, if the equipment orientation is always vertical, e.g., with end A up, then the lower passage 52 may be made narrower than passage 50 to naturally balance the fluid flow in view of gravitational effects, thus eliminating float 51 and substantially simplifying the configuration of three-way valve 48. Similarly, for constantly horizontal operation, like-sized passages 50, 52 may be provided, again eliminating float 51 and substantially simplifying valve 48.

An additional benefit of the present invention is that it securely holds the shaft within the housing with minimal canting of the shaft, as required in precision applications. This stability is provided by close tolerances maintained within the bearing and also by the shaft cones having a common apex with their bases being maximally separated. This arrangement provides a broad fulcrum over which the shaft must cant, making canting less likely.

It will be understood that the above description pertains to only several embodiments of the present invention. Hence, the description is provided by way of illustration and not by way of limitation. The invention, therefore, is to be limited only according to the following claims.

What is claimed is:

1. A self-lubricating hydrodynamic spindle bearing comprising:
   a stationary stator having a bearing surface;
   a rotatably mounted rotor having a bearing surface, the bearing surface of the rotor and the bearing surface of the stator being in sufficiently close spaced apart relationship to form a bearing gap for carrying liquid lubricant, the shape and the position of the rotor and of the stator being effective to form a reservoir for holding liquid lubricant with an outlet to the exterior environment effective to form a clearance seal, the bearing gap being in communication with the reservoir; and means for rotating the rotor, the rotation of the rotor generating a centrifugal force that urges the liquid lubricant out of the reservoir and into the bearing gap, the clearance seal effective to retain liquid lubricant therein forming a barrier to the leakage of the liquid lubricant to the external environment when the rotor is idle.

2. The bearing of claim 1 wherein the rotor comprises a rotatable housing and the stator comprises a fixed spindle shaft, the housing being rotatably sealed over the shaft by endcaps sealingly engaging respective annular ends of the housing, each endcap concentrically mating with the shaft at a central bore and defining a respective clearance seal between the endcap central bore and the shaft.

3. The bearing of claim 2 wherein the reservoir is defined essentially by the housing and an interior face of at least one of the endcaps, in cooperation with the shaft.

4. The bearing of claim 3 wherein the at least one endcap has an arcuate cross-section transverse inner wall.

5. The bearing of claim 4 wherein the at least one endcap includes an interior face and an exterior radial face, the endcap interior face comprising an axially inwardly extending wall structure defined by a radially interior axial wall and a radially exterior axial wall, the interior axial wall defining the endcap central bore, and the exterior axial wall joining the endcap transverse inner wall to form a reservoir base therebetween.

6. The bearing of claim 5 wherein the housing mounted on the shaft comprises a pair of conical bearings having a common apex.

7. The bearing of claim 6 wherein the shaft includes conical portions which mate with wall portions of the housing separated by bearing gaps, respectively, and the housing wall portions are provided with inward-pumping spiral grooves.

8. The bearing of claim 7 wherein at least one of the conical portions is an insert which is mated over and affixed to the shaft.

9. The bearing of claim 7 wherein the wall portions are tapered, flaring radially inwardly from untapered flat surfaces to untapered flat surfaces at truncated ends of the conical portions, defining a connection zone therebetween.

10. The bearing of claim 9 wherein the housing further comprises valve means having a flow control center, with at least one radial passage extending from the connection zone to the flow control center for transmission of lubricant from the connection zone to the valve means, the gap having a lubricant entrance end near to the reservoir and a lubricant exit end at the connection zone, the valve means including at least one essentially axial passage for connection of the valve control center to the entrance end of the gap.

11. The bearing of claim 10 wherein the valve means essentially axial passage is coupled to a radially inwardly directed discharge port adjacent to the gap entrance end.

12. The bearing of claim 11 wherein the valve means further comprises gravitationally adjusting lubricant flow control means.

13. The bearing of claim 12 wherein the gravitationally adjusting lubricant flow control means comprises a float which is disposed to assume a position within the valve control center depending upon the orientation of the bearing at rest, with the float reacting to gravity accordingly.

14. The bearing of claim 12 wherein the axial passage couples to the valve control center at a valve seat, and wherein the float and seat cooperate to control lubricant flow through the passage according to gravitational orientation of the bearing.

15. The bearing of claim 12 wherein the valve means includes axial passages extending toward respective ends of the housing and the gravitationally adjusting lubricant flow control means comprises one of the axial passages having a smaller cross-section than the other axial passage.

16. The bearing of claim 11 further comprising pressure-actuated bladder means for delivery of lubricant to the bearing from a bladder reservoir.

17. The bearing of claim 2 wherein said feeding means comprises at least one of the endcaps for forming a centrifugally actuated lubricant feed means for feeding of lubricant stored in the reservoir to the lubricant entrance end of the at least one gap.

18. The bearing of claim 17 wherein the endcap includes at least one endcap arcuate cross-section transverse inner wall, the bearing further comprising clearing means for drawing lubricant from the clearance seal into the bearing by centrifugal action for clearing the clearance seal thereby, the clearing means being actuated by rotation of the housing and including the at least one endcap arcuate cross-section transverse inner wall.

19. A hydrodynamic bearing comprising
a housing and a shaft with cooperating bearing surfaces in each of two chambers of the bearing, the housing and shaft defining a valve assembly, wherein the valve assembly, by means of relative movement of the housing and shaft, distributes liquid lubricant to the cooperating bearing surfaces, the valve assembly including gravitationally sensitive means for adjusting the liquid lubricant flow to be substantially evenly distributed between the two chambers according to gravitational orientation of the bearing.

20. A method of self-lubricating a hydrodynamic spindle bearing of a magnetic disk drive assembly, including the steps of
rotatably mounting a rotor over a stationary stator, the shape and position of the mounted rotor and of the stator forming a reservoir for holding a liquid lubricant where the reservoir has an outlet to the external environment effective to form a clearance seal, the shape and position of the mounted rotor and of the stator establishing a bearing gap therebetween in communication with the reservoir,
rotating the rotor to generate a centrifugal force, the centrifugal force being effective to evacuate the liquid lubricant in the clearance seal in an inward direction generally parallel to the axis of rotation and also effective to urge the liquid lubricant out of the reservoir and into the bearing gap.

* * * * *